May 20, 1941. C. A. WOODWARD 2,242,716
BEARING MEMBER AND BEARING INSTALLATION
Filed March 20, 1940
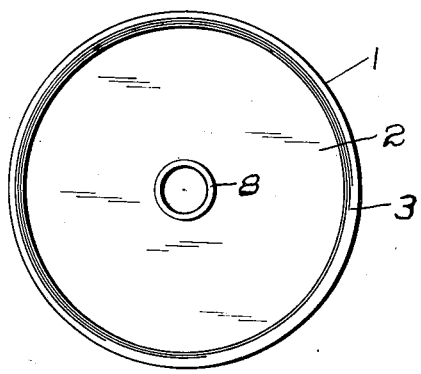
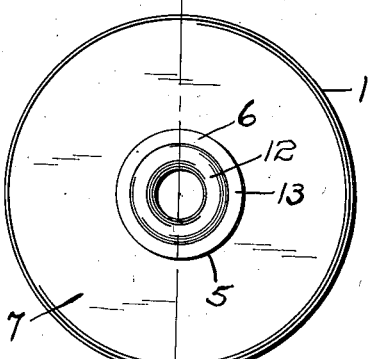
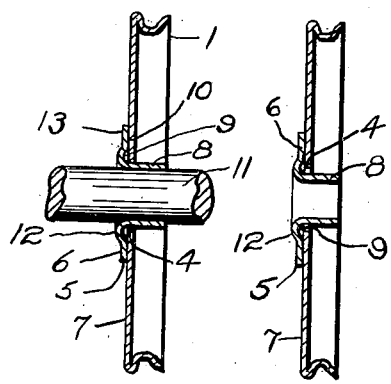
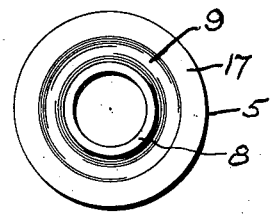
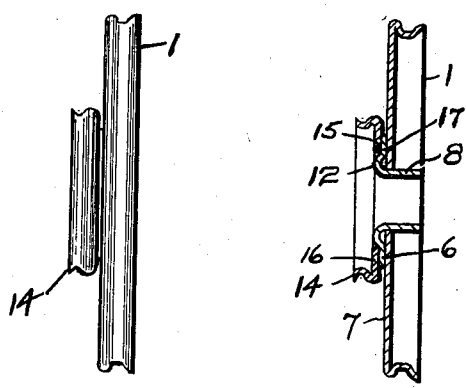
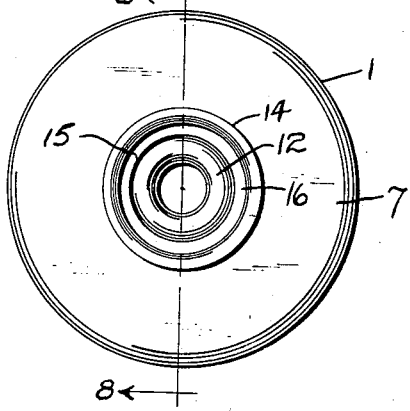
Inventor:
Clement A. Woodward,
by John Todd
Atty.

Patented May 20, 1941

2,242,716

UNITED STATES PATENT OFFICE 2,242,716

BEARING MEMBER AND BEARING INSTALLATION

Clement A. Woodward, Dedham, Mass., assignor to United-Carr Fastener Corporation, Cambridge, Mass., a corporation of Massachusetts Application March 20, 1940, Serial No. 325,060

2 Claims. (Cl. 74—230.8)

This invention relates to improvements in bearing members for securing bodies to shafting and the like and more particularly for securing a rotatable member such as a pulley to a shaft.

The chief object of my invention is the provision of a bearing member formed from sheet metal material and providing a base and a hollow shank formed from the base by a series of drawing operations, the member being constructed in a new and improved manner to provide a minimum radius on the shank adjacent its junction with the base.

Another object of my invention relates to a combination of parts comprising a body member having a hub or bearing member secured centrally thereof, the bearing member providing means enabling a second body which is secured to the first body to be centered easily relative to the first body.

Other objects and uses of my invention will be apparent from inspection of the drawing and specification hereinbelow set forth.

Referring to the drawing, in which I have illustrated preferred embodiments of my invention:

Fig. 1 is a front view of my first form of bearing installation;

Fig. 2 is a rear view of the installation shown in Fig. 1;

Fig. 3 is a sectional view taken on the line 3—3 of Fig. 2;

Fig. 4 is a section similar to Fig. 3 showing a modified form of one of the parts of the installation;

Fig. 5 is an enlarged front view of my improved bearing member per se;

Fig. 6 is a rear view of a modified form of installation embodying my invention;

Fig. 7 is a side view of the installation shown in Fig. 6; and

Fig. 8 is a sectional view taken along the line 8—8 of Fig. 6.

Referring to the drawing, I have shown my improved bearing member preferably used in combination with a pulley of the type commonly employed in radio receiving apparatus for the purpose of guiding the drive cord used in operating a condenser and dial pointer. It is understood that I do not wish to limit the use of my improved bearing member to this particular installation as it is equally adaptable for use in combination with other bodies such as wheels, casters and the like.

Referring to Figs. 1-3 of the drawing, I have shown a pulley 1 preferably formed from one piece of sheet metal having a disk 2 and an annular marginal grooved rim 3. The disk 2, which is preferably of generally flat construction, has an opening 4 formed centrally relative to the rim 3. A separate part is provided for securing the pulley to a support or drive shaft in the form of a bushing or bearing member 5 having a base 6 secured in contiguous superposed relation to a side 7 of the disk 3 and a hollow shaft-receiving shank 8 extending through the opening 4 of the disk.

Referring in detail to my improved bearing member 5, I have shown one which is formed from sheet metal material. Heretofore bearing members have been made to perform an equivalent function, but these have been screw machine parts. Although screw machine bearing members are mechanically satisfactory, it has been found that substantial savings in labor and material are effected in large quantity production by forming them from sheet metal. It is well known that in the ordinary drawing operation by which a tubular portion is pressed from a sheet metal strip the tubular portion provides a curve or radius adjacent its junction with the strip. This is due primarily to the properties of the metal which normally do not permit a drawn portion to extend at an abrupt angle relative to the part from which it is formed. It is not impossible to effect the aforesaid abrupt angle between the drawn portion and the strip, but the methods for so doing are expensive and ordinarily not practical. In consequence of various tolerances which must be considered, such, for example, as variations in the thicknesses of strips of stock and die wear, it is difficult to hold to size the radius of a shank formed by normal methods.

In installations such as the one shown in the drawing where a bearing member is assembled with a body and provides a base flush with a side of a body so as to be spot-welded thereto and a shank extending through an opening of the body and positioned substantially centrally relative to parts of the body, a member formed by normal drawing methods hereinabove described is impractical due to occurrence of the above-mentioned radius. Thus if the diameter of the shank immediately adjacent its junction with the base is appreciably smaller than the opening of the body through which the shank projects, it is difficult to center the shank exactly relative to the rim of the pulley. Furthermore, if the diameter of the shank adjacent the base is appreciably larger than the diameter of the opening of the body, one side of the base may be disposed flush with the body and spot-welded thereto while an opposite side of the base will be spaced from the body causing the shank to tip slightly thereby preventing proper function of the pulley.

In forming my improved bearing member so as to reduce the radius with a consequent removal of the faults caused by the same, I have formed an annular embossment in the base 6 adjacent the junction of the shank 8 therewith. The annular embossment provides an annular depression 9 on the side 10 of the base facing the surface 7 of the disk 2 when the parts of the installation are in final assembly. Thus the radius is taken up by the curve of the depression 9 with the result that the radius of my present construction is offset from the plane of the surface 10 of the base in a direction away from the shank 8. As a result of my improved construction, the shank 8 has a constant diameter along its length from points thereon in the plane of the side 10 of the base to its outermost end.

In assembling the bearing member with the pulley device, the shank 8 is projected through the opening 4 of the disk 2 until the base 6 lies flush with the surface 7 of the disk 2. The bearing member is secured finally to the pulley by spot-welding or other suitable means. The outside diameter of the shank 8, in my preferred installation, is preferably slightly larger than the diameter of the opening 4 enabling the shank 8 to extend through the disk 2 in a press fit. A press fit is preferred in order to assure accurate centralization of the shaft 8 relative to the rim 3.

As a result of my invention, it will be seen that the base 6 of the bearing member may be always brought into flush relationship with the side of the disk 2. This assures right-angular relationship between the shank 8 and the disk 2 when the parts are in final assembly. The pulley may now be secured to a shafting by extending the shaft 11 (Fig. 3) through the bore of the shank 8. The relative dimensions of the shank bore and shaft may be varied to permit the bearing to be free relative to the shaft, or where it is desired to have the parts relatively fixed, the shaft may be knurled and secured within the bore of the shank by a press fit.

If it is desired to secure the pulley to a shaft of smaller diameter, a bearing may be provided generally similar in construction to the bearing 5 illustrated in Fig. 3 but providing a shank 8 of smaller diameter, as shown in Fig. 4. It is possible by a sleeve (not shown) passed over the shank 8, or other means, to center the shank of the smaller bearing correctly within an opening 4 of the same diameter as that for receiving the larger shank. This is the method used for assembling the parts of the installation shown in Fig. 4. However, it is generally desirable to cut the opening 4 in the disk to fit closely with the smaller shank and then enlarge the opening should it be desired to use the larger bearing member.

It will be seen that formation of the annular depression 9 provides an annular projection 12 on the side 13 of the base. Thus in an installation such as shown in Figs. 6-8, where it is desired to secure another body or pulley member 14 to the pulley 1, the pulley 14 may have an opening 15 in its disk 16 of a diameter slightly greater than the diameter of the annular projection 12 with the result that the opening 15 receives the annular projection 12 when the parts are assembled and thereby automatically centers the pulley 14 relative to the pulley 1. The pulley 14 may be secured permanently to the other parts of the installation by spot-welding the disk 16 to the marginal annular flat portion 17 (Figs. 5 and 8) of the base 6.

Another important advantage of my two-piece pulley construction is in the use of pulleys of various sizes. It is usual for the pulleys to fit shafts of the same diameter and therefore I may make one size of bearing member which may fit various sizes of pulleys. Thus the tools for making each size of pulley are much less complicated and can operate faster than would be the case if I had to draw each bearing member integral with each size of pulley.

Although I have illustrated and described preferred embodiments of my invention, I do not wish to be limited thereby because the scope of my invention is best defined in the following claims.

I claim:

1. In combination, a pulley member comprising a disk portion having a marginal grooved rim, said disk portion having a central opening therein, and a bearing member formed from sheet metal and assembled with said disk portion, said bearing member having a base portion and a hollow shank formed from said base portion and extending through said aperture of said disk in contact with the wall surrounding said aperture, said base having a flat portion secured in contiguous superposed relation to said disk, and said bearing member having an annular embossment adjacent the junction of said shank and said base, said embossment providing an annular depression on one side of said base and a complementary annular projection on an opposite side to eliminate the locating of a fillet between the base and the shank that would interfere with the base fitting flat against the disk when the shank fits tightly the wall surrounding said aperture.

2. In combination, a pulley member comprising a disk portion having a marginal grooved rim, said disk portion having a central opening therein, and a bearing member formed from sheet metal and assembled with said disk portion, said bearing member having a base portion and a hollow shank formed from said base portion and extending through said aperture of said disk, said base having a flat portion secured in contiguous superposed relation to said disk, and said bearing member having an annular embossment adjacent the junction of said shank and said base, said embossment providing an annular depression on one side of said base and a complementary annular projection on an opposite side, and a second pulley member assembled with said first pulley member, said second pulley member having a disk and a marginal grooved rim, said disk portion of said second pulley being secured adjacent a side of the disk portion of said first pulley and said disk portion of said second pulley having a central opening receiving said annular projection and cooperating with said projection to center said second pulley relative to said first pulley.

CLEMENT A. WOODWARD.